United States Patent [19]
Mainka et al.

[11] 3,896,745
[45] July 29, 1975

[54] INCINERATOR FOR RAW SEWAGE

[75] Inventors: Christian M. Mainka, New York; George A. Nash, Pleasantville, both of N.Y.

[73] Assignee: Morse Boulger, Inc., Flushing, N.Y.

[22] Filed: Oct. 10, 1974

[21] Appl. No.: 513,922

[52] U.S. Cl............ 110/8 C; 110/8 A; 110/18 C
[51] Int. Cl.[2] ............................................ F23G 5/12
[58] Field of Search ......... 110/8 R, 8 A, 8 C, 18 R, 110/18 C, 9 R

[56] References Cited
UNITED STATES PATENTS

| | | | |
|---|---|---|---|
| 1,995,723 | 3/1935 | Van Denburg .................. | 110/8 |
| 2,925,054 | 2/1960 | Sherman ......................... | 110/8 |
| 3,035,533 | 5/1962 | Hebert et al. .................. | 110/8 |
| 3,664,277 | 5/1972 | Chatterjee et al. ............. | 110/8 |
| 3,665,871 | 5/1972 | Schwartz, Jr. et al. ......... | 110/18 |

*Primary Examiner*—Kenneth W. Sprague
*Attorney, Agent, or Firm*—Mason, Fenwick & Lawrence

[57] ABSTRACT

An incinerator suitable for the thermal disposal of raw sewage and the like generally comprising a housing having a primary combustion chamber, a secondary combustion chamber and a mixing chamber intercommunicating the primary and secondary combustion chambers, the housing having means for charging waste material into the primary chamber, a burner mounted on the housing, the burner including means for injecting a jet flame through the primary combustion chamber and toward the mixing chamber whereby the flame would ignite the waste material in the primary combustion chamber producing combustion gases, vaporize any liquid constituent of the waste material, produce a draft in the primary combustion chamber causing the flow of the combustion gases and vapor toward and through the mixing chamber, into the secondary combustion chamber, and igniting the combustion gases and vapor for secondary combustion in the secondary combustion chamber, and a flue mounted on the housing for conducting residual combustion gases from the secondary combustion chamber to the ambient atmosphere.

12 Claims, 5 Drawing Figures

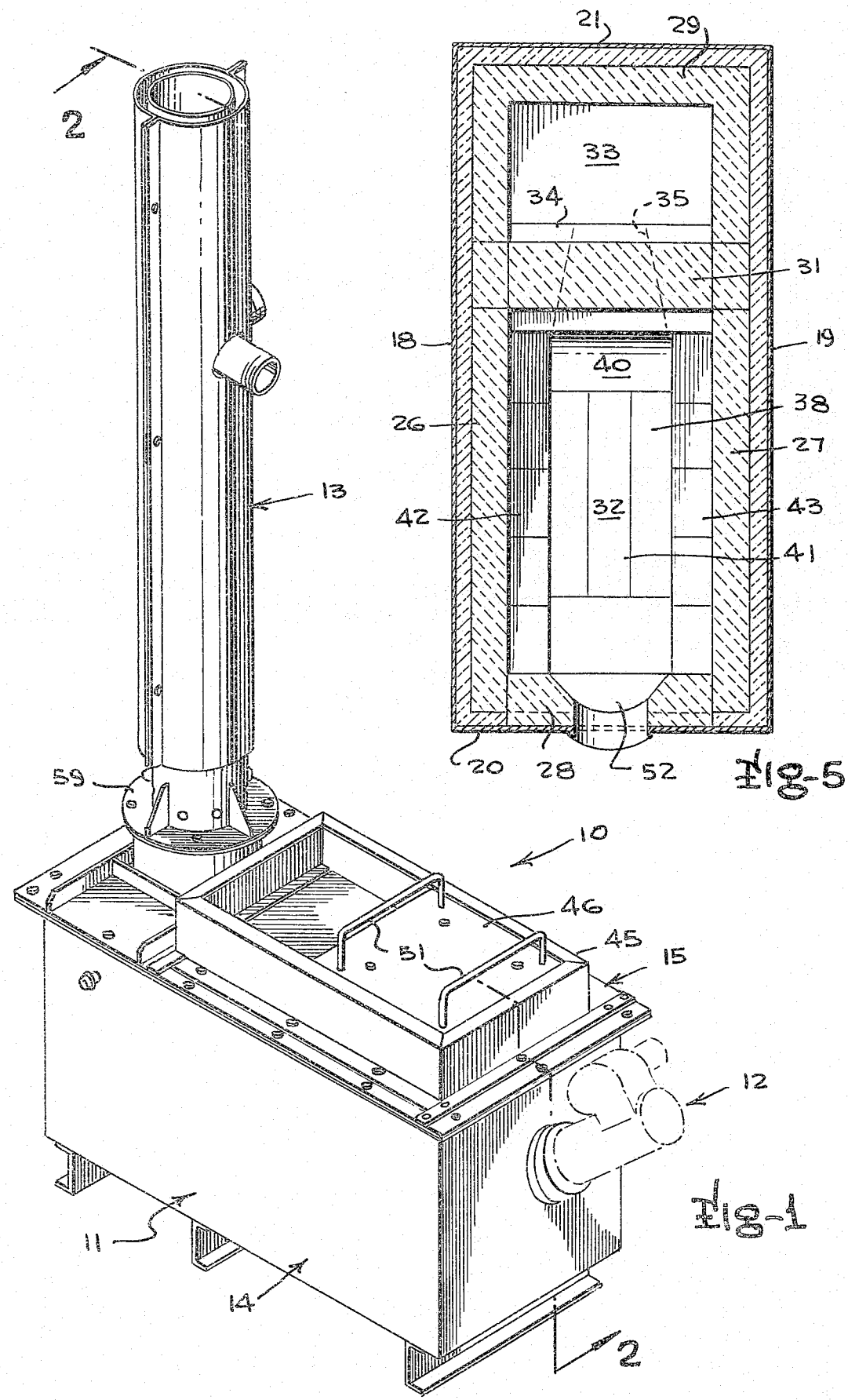

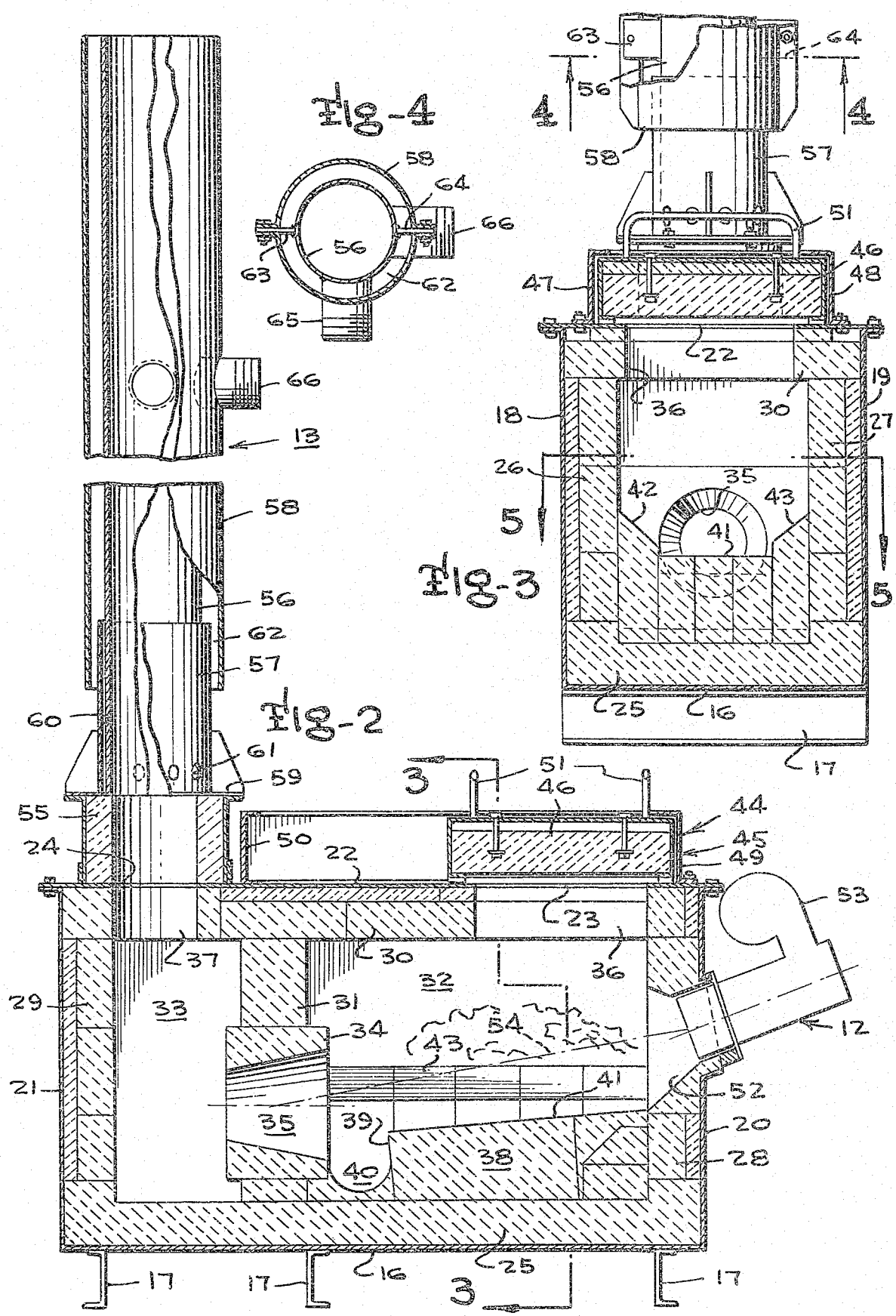

INCINERATOR FOR RAW SEWAGE

This invention relates to an incinerator and more particularly to an incinerator suitable for use in the disposal of small amounts of raw sewage such as human wastes and the like.

In isolated locations inhabited by a relatively small complement of persons, such as small army installations, small naval vessels, railway cars and the like, the disposal of human waste has been a persistent problem. In the past, it principally has been the conventional practice to dispose of such waste material by burying it on land and discharging it into the sea, often resulting in health and pollution problems. More recently, compact waste disposal systems have been developed and deployed with a certain amount of success. However, such systems have been found to be comparatively costly which has prompted the development of a low cost, sanitary and effective device for the disposal of small quantities of raw sewage.

Accordingly, it is the principal object of the present invention to provide a novel apparatus for the disposal of raw sewage such as human waste and the like.

Another object of the present invention is to provide a novel apparatus for the disposal of raw sewage which is effective in performance to avoid hazardous health and pollution problems.

A further object of the present invention is to provide a novel apparatus adapted to reduce raw sewage such as human waste to an inert residue.

A still further object of the present invention is to provide a novel apparatus for economically disposing of small quantities of raw sewage.

Another object of the present invention is to provide a novel apparatus suitable for use in isolated locations inhabited by small complements of persons such as small army installations, small naval vessels, railway cars and the like for the disposal of human wastes.

A further object of the present invention is to provide a novel apparatus for the economical and sanitary disposal of human waste which avoids burying it on land or discharging it into the sea, correspondingly avoiding resultant pollution.

A still further object of the present invention is to provide a novel incinerator for raw sewage such as human waste.

Another object of the present invention is to provide a novel incinerator suitable for reducing small quantities of raw sewage to an inert residue.

A further object of the present invention is to provide a novel incinerator adapted to handle small quantities of raw sewage and which further is adapted to achieve complete and odorless combustion of such sewage.

A still further object of the present invention is to provide a novel incinerator suitable for use at isolated locations inhabited by small complements of persons which is comparatively simple in design, relatively inexpensive to manufacture and operate, and highly effective in performance.

Other objects and advantages will become more apparent to those persons having ordinary skill in the art to which the present invention pertains, from the following description taken in conjunction with the accompanying drawings wherein:

FIG. 1 is a perspective view of an embodiment of the invention;

FIG. 2 is an enlarged cross-sectional view taken along line 2—2 in FIG. 1;

FIG. 3 is a cross-sectional view taken along line 3—3 in FIG. 2;

FIG. 4 is a cross-sectional view taken along line 4—4 in FIG. 3; and

FIG. 5 is a cross-sectional view taken along line 5—5 in FIG. 3.

Referring to the drawings, there is illustrated an embodiment of the invention consisting of an incinerator 10 generally including a housing 11 providing a number of combustion chambers, a burner 12 mounted on the housing for igniting waste material charged into the housing, and a flue assembly 13 also mounted on the housing for exhausting combustion gases into the ambient atmosphere. The housing includes a casing consisting of a lower section 14 and an upper section 15. The lower casing section includes a bottom wall 16 adapted to be seated on a plurality of transversely disposed structural members 17 or another suitable foundation, a pair of side walls 18 and 19, a front wall 20 and a rear wall 21. Upper casing section 15 forms a closure for the upper opening provided by the side and end walls of the lower casing section, and is bolted about the periphery thereof to a peripheral flange provided on the lower casing section. The casing sections are formed of a material having sufficient strength characteristics, preferably a metal such as steel. It also may be fabricated by any suitable method such as welding steel plates or sheets together. As best illustrated in FIG. 2, closure section 22 is provided with an access opening 23 and an exhaust opening 24.

Disposed within casing 14 is a lining of fire resistance material which includes a bottom wall 25, a pair of side walls 26 and 27, a front end wall 28, a rear end wall 29, and an upper wall 30. As best illustrated in FIG. 2, the housing further is provided with a transverse partition wall 31 defining a primary combustion chamber 32 and a secondary combustion chamber 33. The partition wall 31 has a section 34 provided with an opening 35 intercommunicating the primary and secondary combustion chambers. Opening 35 preferably has a frusto-conical configuration and functions as a mixing chamber, as later will be described. Upper lining wall 30 is provided with an access opening 36 registering with access opening 23 in the upper casing section to provide an access opening in the housing for charging waste material into the primary combustion chamber. Upper lining wall 30 further is provided with an opening 37 registering with opening 24 in the upper casing section to provide an exhaust passageway through the upper end of the housing, intercommunicating the secondary combustion chamber with the flue.

Mounted on the lower lining wall 25 adjacent the front lining wall is a hearth 38. The rearward end 39 of the hearth is spaced from partition wall section 34 to provide a transversely disposed trough 40. The upper portion of hearth 38 is provided with a longitudinally sloping, intermediate surface section 41 and transversely inclined side surfaces 42 and 43 which at least partially lie beneath aligned access openings 23 and 36. Surfaces 41 through 43 are adapted to receive waste material charged into primary combustion chamber 32, retain the solid constituents of the material on the hearth for primary combustion, and guide the liquid constituents of the material toward and into trough 40. As best illustrated in FIG. 2, the surface of trough 40 is rounded and lies below the levels of the upper surfaces of the hearth and opening 35 in partition wall section 34.

The upper end of the housing is provided with a sliding door assembly 44 for closing the access opening leading to the primary combustion chamber. The assembly includes a guide member 45 seated on the upper casing section which guides a sliding door 46 over and away from the access opening. The guide member includes a pair of transversely spaced, longitudinally disposed side walls 47 and 48 and a pair of front and rear walls 49 and 50. As best shown in FIG. 3, sliding door 46 has a width slightly less than the spacing between side walls 47 and 48 of the guide member, and a width greater than the width of the access opening in the housing so that the door may be slid longitudinally through the use of a pair of handles 51 to open and close the access opening in the housing. The portion of the sliding door which is exposed to the primary combustion chamber is formed of a fire resistant material similar to the material lining the casing of the housing.

Burner 12 may be of any conventional type and is mounted on casing section 20 with the front end thereof extending through an opening 52 in lining wall 28. The burner is provided with a fuel supply line and a blower 53 which supplies primary air to be mixed with the fuel supplied to the burner. The burner is further provided with a nozzle and ignition means for injecting a jet flame through the primary combustion chamber and into the mixing chamber, as illustrated by a phantom line 54 in FIG. 2.

Flue assembly 13 is supported on a base conduit 55 which registers with the exhaust opening in the housing, and includes an exhaust conduit 56, an inner sleeve 57 and an outer sleeve 58. The lower end of exhaust conduit 56 is provided with an angular flange 59 which is seated and bolted to an upper flange provided on base conduit 55 so that the interior of the exhaust conduit communicates through the base conduit and the exhaust opening in the housing with secondary combustion chamber 33. The lower end of sleeve 57 is seated and secured to annular flange 58 of the exhaust conduit and has an innerdiameter slightly greater than the outside diameter of the exhaust conduit to provide an annular passageway 60. The inner sleeve further is provided with a plurality of circumferentially spaced openings 61 which intercommunicate annular passageway 60 and the ambient atmosphere.

The lower end of outer sleeve 58 terminates at a point between openings 61 and the upper edge of inner sleeve 57. It further is provided with an innerdiameter slightly greater than the outside diameter of inner sleeve 57 to provide an annular passageway 62 which extends to the upper end of the flue assembly. As best illustrated in FIG. 4, outer sleeve 58 is formed in two semi-cylindrical sections provided with flanges which may be mounted on longitudinally spaced brackets 63 and 64 provided on the exhaust conduit to position the outer sleeve in spaced and concentric relation with the exhaust conduit.

In the operation of the embodiment as described, the burner is first energized with the sliding door in the closed position to preheat the primary, secondary and mixing chambers of the incinerator. The door is then slid toward the flue assembly to obtain access to the primary combustion chamber, waste material is charged into the primary combustion chamber so that it is deposited on the upper surfaces of the hearth, and the door is closed. The solid constituents of the waste material will remain on the hearth while the liquid constituents thereof will be caused to flow downwardly into trough 40. As the burner is energized and the material is subjected to the heat of the flame injected through the primary combustion chamber and into the mixing chamber, the solid constituents of waste material on the hearth will be burned to produce combustion gases and the liquid constituents thereof in the trough will be caused to vaporize. The flame also would function to provide an induced draft, causing the combustion gases emanating from the solids on the hearth and the vapor emanating from the liquid in the trough to flow through mixing chamber 35 where the combustion gases and vapor are mixed and reignited. As the mixture of combustion gases and vapor enters and traverses through secondary combustion chamber 33, a secondary combustion occurs to complete the incineration of the waste material. Residual combustion gases then are exhausted through exhaust conduit 56 into the ambient atmosphere. To periodically obtain samples of the emissions of the incinerator for testing purposes, there are provided a pair of conduits 65 and 66 which are mounted on and communicate with the interior of the exhaust conduit, pass through openings through outer sleeve 58 and may be connected to suitable conduits for conducting the emissions to a testing apparatus.

Preferably, the exhaust conduit is formed of a fire resistant material having good heat resisting properties such as stainless steel. The exhaust conduit is cooled by virtue of air being drawn from the ambient atmosphere through holes 61 in the inner sleeve, which is caused to flow upwardly through annular passageways 60 and 62 in heat exchange relation with the exhaust conduit. As an alternate type of flue assembly, openings 61 may be communicated with the intake of blower 53 so that ambient air will be drawn through annular passageways 62 and 60, openings 61 and a connecting line to the intake of blower 53 thereby providing a preheated primary air for the burner. It is contemplated that such alternate type of arrangement, the efficiency of the incinerator would be enhanced.

From the foregoing detailed description, it will be evident that there are a number of changes, adaptations and modifications of the present invention which will come within the province of those persons having ordinary skill in the art to which the present invention pertains. However, it is intended that all such variations not departing from the spirit of the invention be considered within the scope thereof as limited solely by the appended claims.

We claim:

1. An incinerator for the thermal disposal of raw sewage such as human waste and the like comprising a housing having a primary combustion chamber, a secondary combustion chamber and a mixing chamber intercommunicating said primary and secondary combustion chambers, said housing having means for charging waste material into said primary combustion chamber, a burner mounted on said housing, said burner including means for injecting a flame through said primary combustion chamber and toward said mixing chamber whereby said flame functions to ignite said waste material producing combustion gases, vaporize any liquid constituents of said waste material, produce an induced draft in said primary combustion chamber causing the flow of said combustion gases and said vapor toward and through said mixing chamber, into said secondary combustion chamber, and igniting said mixture of said vapopr and combustion gases for secondary combustion in said secondary combustion chamber, and a flue mounted on said housing for conducting residual combustion gases from said secondary combustion chamber to the ambient atmosphere.

2. An incinerator according to claim 1 wherein said primary combustion chamber includes a trough for receiving liquid constituents of waste material charged into the primary combustion chamber.

3. An incinerator according to claim 2 wherein said primary combustion chamber includes a hearth on which waste material charged into said primary combustion chamber is received and wherein said trough is disposed between said hearth and said mixing chamber.

4. An incinerator according to claim 3 wherein said hearth includes at least one surface inclined downwardly toward said trough.

5. An incinerator according to claim 3 wherein said means for charging waste material into said primary combustion chamber consists of an access opening in said housing communicating with said primary combustion chamber, having a closing door.

6. An incinerator according to claim 1 wherein said primary combustion chamber includes a hearth on which waste material charged into said primary combustion chamber may be deposited, said primary combustion chamber includes a trough disposed between said hearth and said mixing chamber for receiving liquid constituents of waste material charged into the primary combustion chamber and deposited on said hearth, said hearth includes at least one surface inclined downwardly toward said trough, and said means for charging waste material into said primary combustion chamber consists of an access opening in said housing communicating with said primary combustion chamber, having a closing door.

7. An incinerator according to claim 1 wherein said mixing chamber has a frusto-conical configuration.

8. An incinerator according to claim 1 wherein said means for injecting a flame includes means for injecting said flame through said primary combustion chamber and at least partially into said mixing chamber.

9. An incinerator according to claim 1 wherein said means for injecting a flame comprises a nozzle which directs a flame jet toward said mixing chamber.

10. An incinerator according to claim 1 wherein said flue comprises an exhaust conduit intercommunicating said secondary combustion chamber and the ambient atmosphere, and inner sleeve providing a passageway between said exhaust conduit and said inner sleeve, a lower end of said passageway between said exhaust conduit and said inner sleeve being closed, the upper end of said inner sleeve terminating below the upper end of said exhaust conduit, and an outer sleeve providing a passageway between said exhaust conduit and inner sleeve and said outer sleeve, a lower end of said outer sleeve terminating below the upper end of said inner sleeve, said inner sleeve having a plurality of circumferentially spaced openings through which ambient air may be drawn and induced to flow upwardly between said passageways between said exhaust conduit and said inner sleeve and said exhaust conduit and said outer sleeve.

11. A incinerator according to claim 1 wherein said flue comprises an exhaust conduit intercommunicating said secondary combustion chamber and the ambient atmosphere, and at least one sleeve providing a passageway between said exhaust conduit and said sleeve, closed at a lower end thereof, and means intercommunicating a lower end of said passageway between said exhaust conduit and said sleeve and an intake of said burner whereby ambient air is induced to flow through said passageway between said exhaust conduit and sleeve, through said intercommunicating means and into said burner intake as preheated primary combustion air.

12. An incinerator according to claim 1 wherein said exhaust conduit is fabricated of a fire resistant material.

* * * * *